3,496,251
CHLORINATED POLYETHYLENE GRAFT COPOLYMER AND BLENDS CONTAINING SAME
Akira Takahashi, Kawasaki-shi, Kanagawa-ken, Hiroo Kojima, Nerima-ku, Tokyo, Masao Ogawa, Kamakura-shi, Kanagawa-ken, and Hiroshi Osuka and Shoichi Kobayashi, Kawasaki-shi, Kanagawa-ken, Japan, assignors to Showa Denko Kabushiki Kaisha, Tokyo, Japan, a corporation of Japan
No Drawing. Filed Jan. 24, 1964, Ser. No. 339,899
Int. Cl. C08f 15/40
U.S. Cl. 260—876                                    9 Claims

ABSTRACT OF THE DISCLOSURE

A thermoplastic resin having high impact strength and a process for producing such thermoplastic resin, the thermoplastic resin being obtained by polymerizing a homogeneous mixture comprising, (a) chlorinated polyethylene; (b) acrylonitrile; and (c) a polymerizable monomer selected from styrene and a methyl methacrylate. Also, a thermoplastic resin composition having a high impact strength comprising the thermoplastic resin set forth above in admixture with a polyvinyl chloride resin and from 0 to 30 percent by weight of polymethylmethacrylate.

---

This invention relates to a thermoplastic resin obtained by reacting under polymerizing conditions chlorinated polyethylene with a mixture consisting of acrylonitrile and styrene and/or methyl methacrylate, and to a process for preparing the same, said resin not only having high tensile as well as impact strength but excelling in flame resistance, weatherability, processability and dimensional stability, as well. Further, the invention also relates to the usage of the foregoing resin by blending it with polyvinyl chloride to obtain a thermoplastic resin composition having excellent physical properties.

Heretofore, as thermoplastic three-component polymeric compositions, there are known, for example, what are generally referred to as the ABS polymers, which are either copolymers or polymeric or copolymeric mixtures consisting of acrylonitrile, styrene and butadiene. These are prepared by using as the rubber component polybutadiene, butadiene-acrylonitrile copolymer (NBR), the butadiene-styrene copolymer (SBR), natural rubber and the like, and either grafting thereto in the form of a homopolymer or copolymer between acrylonitrile and styrene, or blending therewith acryonitrile and styrene which have been homopolymerized or copolymerized in advance. While these ABS polymers and the other three-component polymeric composition of the same class are all comparatively good in their impact strength and dimensional stability, their flame resistance, resistance to burning, weatherability and processability are however not yet quite satisfactory. Moreover, they are all either yellow or yellowish brown in color.

It is the object of this invention to eliminate these shortcomings that the conventional three-component polymers have with respect to their properties and to provide a resin which is greatly improved in these properties and also a process by which this resin is prepared.

The foregoing object of the invention is accomplished by polymerizing a homogeneous mixture consisting of (a) chlorinated polyethylene, (b) acrylonitrile and (c) at least one of the polymerizable monomers selected from the group consisting of styrene and methyl methacrylate, the composition of which mixture is 10–80% by weight of (a) and 20–90% by weight of (b)+(c); and thereafter obtaining the solid polymer by separation.

The term chlorinated polyethylene as used herein and the appended claims comprehends the so-called chlorinated polyethylene, i.e., polyethylene which has been chlorinated.

If explained in greater detail, a chlorinated polyethylene having a degree of chlorination of 10–50% by weight, preferably 20–40% by weight is blended homogeneously with a mixture consisting of acrylonitrile and styrene and/or methyl methacrylate after first having dissolved the former in an non-polymerizable organic solvent or without doing so, i.e., without using a solvent at all. The weight ratio between the acrylonitrile and the styrene and/or methyl methacrylate can be in any proportion as desired.

When the degree of chlorination of the chlorinated polyethylene does not exceed 10%, since properties intermediate of those of rubber and plastics are exhibited and rubberlike properties not being manifested, the hoped-for excellent properties cannot be imparted to the resin as contemplated by this invention. On the other hand, if the chlorine content of the chlorinated polyethylene is insufficient, its compatibility with other resinous polymerized matter decreases, with the consequence that it is undesirable from the standpoint of the operation of blending the chlorinated polyethylene with other resinous polymerized matter. When the degree of chlorination exceeds 50%, however, the rubberlike properties of the chlorinated polyethylene suffer and hence it becomes not fit for use in the present invention.

As the non-polymerizable organic solvents which can be used either singly or in combination, included are, for example, the halogenated aliphatic hydrocarbons such as chloroform, carbon tetrachloride, monofluorotrichloromethane, dichloroethanes and trichloroethanes; the halogenated aromatic hydrocarbons such as the chlorobenzenes; the aromatic hydrocarbons such as toluene and benzene; and others which can easily dissolve the chlorinated polyethylene.

The form which the homogeneous mixture mentioned above can take includes any and all forms that are sufficient for setting up a uniform reaction; namely, it may be a state in which the chlorinated polyethylene and the monomers are in a mutually dissolved state, or a state in which the chlorinated polyethylene and the monomers are either in solution in a solvent, in a swelled state, in a colloidal state or in a state of dispersion as fine particles.

Next, the polymerization reaction is carried out either by heating this homogeneous mixture in the presence of a catalytic amount of a polymerization catalyst or by subjecting it to the irradiation of ionizing rays. As the polymerization catalysts, suitably used are the well-known radical-forming polymerization catalysts such as, for example, benzoyl peroxide and azobisisobutyronitrile. As the ionizing radiation, any of the radiating rays such as, for example, X-rays, gamma rays, electron rays, proton rays, deuteron rays, alpha rays, neutron rays, fission fragments, etc., may be applied.

When using a catalyst, the recation temperature can be suitably decided in accordance with the type of catalyst. In a grafting reaction in which abstraction is necessary as in this reaction, generally an enhancement in the grafting efficiency can be expected as the reaction temperature rises. However, on the other hand, since there is a possibility of inducing a reduction in the molecular weight of the polymer by an increase in the transfer reaction, the selection of the reaction temperature is of importance. The temperature to be employed when using a catalyst ranges between 40° and 150° C. Usually preferred is a temperature of 50–100° C.

When using radiating rays, the reaction can be carried out satisfactorily by an irradiation in which the dose is $10^4$–$10^7$ rad and the dose rate is $10^2$–$10^6$ rad./hr. with the temperature ranging between room temperature and 60° C. The reaction can be likewise carried out using ultraviolet rays. And it is characteristic of these methods that resins having a particularly high degree of transparency are obtained. However, since ionizing radiations have a disintegrating action with respect to polymethylmethacrylate, their use must be avoided in those instances where methyl methacrylate is added as a monomeric component.

The solvent used not only has the function of merely effecting the uniform contact of the chlorinated polyethylene monomers but has some bearing on the properties of the product. For example, when benzene or toluene is used as the solvent, the chain of the acrylonitrile-styrene copolymer in the product is not shortened; whereas when a chain transfer agent such as chloroform, carbon tetrachloride and monofluorotrichloromethane is used as a solvent, it becomes short. Further, as chloroform is abstracted of its hydrogen by means of the polymerization catalyst to readily become a trichloromethyl radical, which in turn abstracts hydrogen from the polymer, chloroform is conveniently used as the solvent when an enhancement in the graft efficiency is contemplated.

The time required for the polymerization reaction is usually from several hours to about 20 hours when a catalyst is used, and on the other hand, usually 20–70 hours when ionizing rays are used.

After completion of the reaction, the intended resin is separated and obtained as a solid from the reaction product. The separation is carried out by customary procedures. For example, the liquid reaction product is poured into methanol to precipitate the polymer, after which the solid is separated from the liquid and then dried.

While the composition of the resin obtained as above cannot be fully clarified by the testing methods known up to the present, it is presumed, when considered from the species of reactants used and the reaction conditions adopted, to be a mixed composition consisting of chlorinated polyethylene, a copolymer of acrylonitrile with styrene and/or methyl methacrylate, a graft copolymer of chlorinated polyethylene and a small amount of the homopolymers of each of the monomers used. Further, it is definite that the composition varies with the proportion in which the reactants are used and the conditions of the reaction employed, and that accordingly the properties of the resin vary to some extent. The properties, however, which can be said to be common to all are that the excellent rubberlike properties of the chlorinated polyethylene are manifested conspicuously, that the weatherability (resistances to ozone and ultraviolet rays) is good which is ascribable to the fact that the chlorinated polyethylene molecule does not contain double bonds as in the case of PBR (polybutadiene rubber), NBR, SBR and natural rubber, that its processability is excellent, it being possible to process it readily at far lower temperatures than the other known resins of this type, that its dimensional stability is great, and further that its flame resistance is greatly superior to the conventional resins of this type owing to its chemical structure which contains chlorine. For example, when two examples of the resin according to the present invention are compared with respect to their flame resistance with "Cycolac" (ABS polymer-Marbon Chemicals Co.), a marked enhancement in the flame resistance is observed as shown in the following table.

| Sample | Chlorinated Polyethylene Content of Resin, percent | Burning Speed,[1] sec. |
|---|---|---|
| Resin according to this invention | 20.4 | 117 |
| Do | 27.8 | 135 |
| Cycolac (T) | | 64 |
| Cycolac (H) | | 58 |

[1] Tested in accordance with ASTM-D635-56.

The resin according to this invention not only has an exceedingly high impact strength, but its tensile strength is also considerably high. The extent of these strengths is influenced by the magnitude of the content of the chlorinated polyethylene component, however. In general, as the content of the chlorinated polyethylene becomes higher, the impact strength increases along with the modulus of elasticity and elongation, while the tensile strength gradually declines.

Another feature of the invention resides in the point that the shaped articles made from the resin obtained according to this invention have a color that is generally lighter than the conventional articles and furthermore that this state is freely controllable as required. For example, if azobisisobutyronitrile is used as the polymerization catalyst, a white, transparent or semitransparent article is obtained. On the other hand, a colorless transparent article can be obtained generally when the polymerization reaction is carried out at elevated temperatures of 90–120° C. Or it can also be obtained by carrying out the polymerization reaction under irradiation of an ionizing radiation, for example, at room temperature.

In view of the fact that the resin according to this invention possesses these many advantages and features, its application to a wide range of uses can be expected. Particularly, the fact that it excels in weatherability and flame resistance opens new uses for it as a building or furniture material, which hitherto could not have been conceivable.

Besides the various properties as described above, the resin according to this invention also excels in its compatibility with other thermoplastic resins. Thus its use as a compound with the other resins can also be expected. We found that an excellent thermoplastic resin composition possessing a high degree of impact strength and flame resistance could be provided by blending the resin of present invention with particularly the polyvinyl chloride resin or by blending therewith further a small amount of polymethylmethacrylate. A detail description of such a resin composition is given below.

Heretofore, a composition comprising an ABS polymer and polyvinyl chloride is known. However, as compared with this composition, a composition comprising the resin of present invention and polyvinyl chloride is much more superior in its impact strength and moreover it is also much better with respect to its processability. This is ascribable to the fact that the resin of present invention is better than the ABS polymer in its compatibility with polyvinyl chloride. And the reason therefor is presumed to be due to the fact that the former is structurally more similar to polyvinyl chloride than the latter. The flame resistance and the other properties possessed by this resin composition as well as the uses that are expected for it are substantially the same as that already mentioned for the resin of present invention.

While the polyvinyl chloride to be blended is principally a rigid polyvinyl chloride having a degree of polymerization of 500–2000, in those cases in which pliability is required, it is also possible to use a copolymer of vinyl chloride with not more than 15% of vinyl acetate or other vinyl monomers; or in the case it is contemplated to enhance particularly the product's resistance to chemicals and flame, a copolymer of vinyl chloride with vinylidene chloride can be used. Hence, it is to be understood that the term vinyl chloride type resins as used herein and the appended claims is to comprehend not only the vinyl chloride homopolymers but these other resins as well.

Although the proportion in which the resin according to this invention is mixed with the polyvinylchloride may be freely selected in accordance with the end desired, in the case the requirement calls particularly for impact strength, preferably the amount contained of the polyvinylchloride in the mixed resin composition is of the order of 90–60% by weight. On the other hand, when the flame resistance is particularly important, this end can be attained by the increasing of the polyvinylchloride content to above 20% by weight. The mixed resin composition can be made self-extinguishing by means of this 20% by weight polyvinylchloride content.

Further, by adding a small quantity, say, 5–30 parts by weight, of polymethylmethacrylate to 100 parts by weight of the mixed composition of the resin of present invention and polyvinyl chloride it becomes possible to enhance the surface abrasion resistance, surface luster, tensile strength and weatherability of the product. The addition of the polymethylmethacrylate in an amount exceeding 30 parts by weight should be avoided however, since a decline in the impact strength takes place. The polymethylmethacrylate added is preferably one having a degree of polymerization of the order of about 1000.

In blending these various components, customary procedures can be followed. For example, the resin of present invention and the powdered or pelletized polyvinylchloride can be mixed homogeneously by means of heated rolls, a Banbury mixer, an extrusion molder, etc. Alternatively, a suspension, emulsion of a solution of the polyvinylchloride can be directly mixed with a suspension, emulsion or solution of the resin of present invention, after which the solvent is removed and the mixture dried to obtain the mixed composition in powdered form.

It is also possible to add during the mixing, in customary manner, stabilizers and antioxidants of polyvinylchloride or antioxidants of the resin of present invention and, if necessary, the various fillers, lubricants, coloring agents, plasticizers, etc.

For a clearer understanding, the following specific examples are given. These examples are intended to be merely illustrative of the invention and not in limitation thereof. Unless otherwise specified, all parts and percentages are on a weight basis.

EXAMPLE 1

An ampoule is charged with 2 parts of chlorinated polyethylene (degree of chlorination 34%), 2.5 parts of acrylonitrile, 7.5 parts of styrene, 20 parts of chloroform and 0.18 part of benzoyl peroxide. The monomers and solvents are frozen, the system is evacuated twice for 5 minutes at $10^{-2}$ mm. Hg, and the ampoule is melt-sealed. Then by means of application of heat the chlorinated polyethylene is completely dissolved. After heating this ampoule at 60° C. for 16 hours, it is cooled. The liquid content is then poured into methanol to precipitate a polymer as a solid, which is isolated from the unreacted substances and solvents and dried in vacuum at 50° C.

The resulting product was a yellowish white, opaque resin, and the conversion (percentage consumed in the polymerization reaction) of the monomeric mixture of acrylonitrile and styrene was 72.4%. Hence, it is seen this product is a resin containing 21% of the chlorinated polyethylene component.

After putting this product through mixing rolls, specimen used for testing its properties are molded using a heated press. Then a tensile test was conducted in accordance with ASTM–D638–61T. When a pulling speed of 5 mm./min. was used, the tensile strength was 3.5 kg./mm.², the elongation at break was 84% and the modulus of elasticity was 137 kg./mm.².

On the other hand, in the flammability test in accordance with ASTM–D635–56, whereas the burning speed between the marked lines in the case of "Cycolac" was 57–60 seconds, in the case of this product, a value of 117 seconds was shown.

EXAMPLE 2

Five parts of chlorinated polyethylene, 7.5 parts of acrylonitrile, 12.5 parts of styrene, 20 parts of chloroform and 0.06 part of benzoyl peroxide are reacted for 6 hours at 100° C. The conversion in this case of the monomeric mixture of acrylonitrile and styrene was 73.9%. This product was a white, opaque polymer containing 25.4% of chlorinated polyethylene. The test specimen obtained by molding as in Example 1 had a tensile strength of 4.1 kg./mm.² at a pulling speed of 50 mm./min. and an impact strength of 3.4 kg.–cm./cm. as measured by means of the Dynstat.

EXAMPLES 3–7

The procedures in carrying out each of these examples are as described below. The properties of the polymers obtained are summarized in Table I shown hereinafter, the properties of two examples of the ABS type resin being presented together by way of comparison.

Example 3: In a mixture consisting of 60 parts of acrylonitrile, 180 parts of styrene and 480 parts of chloroform is dissolved 72 parts of chlorinated polyethylene having a degree of chlorination of 40.1%, following which 0.5 g. of benzoyl peroxide is added and then the mixture is heated for 6 hours at 100° C. The conversion of the monomeric mixture of acrylonitrile and styrene in this instance was 59%. Hence, the resulting polymer contains 33.8% of chlorinated polyethylene.

Example 4: In a mixture consisting of 7.5 parts of acrylonitrile, 12.5 parts of styrene and 20 parts of chloroform is dissolved 4 parts of chlorinated polyethylene having a degree of chlorination of 39.3%. Then, after adding 0.06 part of benzoyl peroxide, the mixture is heated for 6 hours at 100° C. The conversion of the monomeric mixture of acrylonitrile and styrene in this instance was 74.9%. Hence, the resulting polymer contains 21.2% of chlorinated polyethylene.

Example 5: In a mixture consisting of 5 parts of acrylonitrile, 15 parts of styrene and 20 parts of ethylene dichloride is dissolved 5 parts of chlorinated polyethylene having a degree of chlorination of 38.2%. Then, after adding 0.06 part of benzoyl peroxide to this mixture and further, as a stabilizer, 0.5 part of dibutyl tin dimaleate, it is heated for 12 hours at 100° C. The conversion of the acrylonitrile and styrene monomers in this instance was 82.5%. Hence, the resulting polymer contains 23.3% of chlorinated polyethylene.

Example 6: In a mixture consisting of 7.5 parts of acrylonitrile, 12.5 parts of styrene and 20 parts of chloroform is dissolved 5 parts of chlorinated polyethylene having a degree of chlorination of 36.4%, following which 0.06 part of benzoyl peroxide is added to the mixture, which is then heated for 6 hours at 100° C. The conversion of the acrylonitrile and styrene monomers in this instance was 73.9%. Hence, the resulting polymer contains 25.4% of chlorinated polyethylene.

Example 7: Five parts of "Hypalon" is dissolved in a mixture consisting of 5 parts of acrylonitrile, 15 parts of styrene and 40 parts of chloroform, after which 0.04 part of benzoyl peroxide is added to this mixture, which is then heated for 6 hours at 100° C. The conversion of the monomers is 85.7%. Hence, the resulting polymer contains 23% of "Hypalon."

TABLE I

| Ex. | Tensile Strength at 50mm./min., kg./mm.² | Elongation at 50 mm./min., Percent | Impact Strength Dynstat, kg.-cm./cm. | Heat Distortion Vicat, °C | | Melt Index: 21.6 kg., 210° C. | Shore Hardness | Tensile Strength (Elongation) Using Weather-O-Meter | | | Burning Speed (ASTM-D635-56), sec. | Sp. Gr. | Transparency |
|---|---|---|---|---|---|---|---|---|---|---|---|---|---|
| | | | | 0.5 mm. | 1.0 mm. | | | 80 hr. | 160 hr. | 240 hr. | | | |
| 3 | 3.0 | 166.0 | 3.5 | 84.9 | 91.0 | | | 2.9 (100) | 2.9 (100) | 3.0 (47) | | | |
| 4 | 3.8 | 52.5 | 3.7 | 104.2 | 105.9 | 23.0 | | | | | | | |
| 5 | 4.0 | 32.5 | 3.2 | | | | | | | | | | |
| 6 | 4.1 | 35.0 | 3.4 | | | | 83 | | | | | | |
| 7 | 3.9 | 130 | 4.4 | 87 | 88 | | | | | | 125 | 1.10 | Good. |
| ABS type Resin Cycolac T. | 4.2 | 40 | 3.3 | 101 | 104 | | 78 | | | | 64 | 1.04 | Opaque. |
| ABS type Resin Cycolac H. | 3.2 | 50 | 4.6 | 99 | 102 | | | | | | 57 | 1.02 | Do. |

EXAMPLE 8

Example 1 is repeated except that instead of the benzoyl peroxide 0.06 part of azobisisobutyronitrile is used as the polymerization catalyst.

The resulting product was white and semitransparent, and the conversion of the monomeric mixture of acrylonitrile and styrene was 83.4%. Hence this resin contains 19.4% of the chlorinated polyethylene component. The test specimen obtained by molding as in Example 1 exhibited, at a pulling speed of 5 mm./min., a tensile strength of 3.4 kg./mm.², an elongation at break of 33% and a modulus of elasticity of 160 kg./mm.².

EXAMPLE 9

Excepting that 20 parts of toluene is used as the solvent, otherwise the same procedures as described in Example 8 are followed.

A white, semitransparent resin containing 20% of the chlorinated polyethylene component was obtained at a conversion of 79.9% for the monomeric mixture of acrylonitrile and styrene.

The test specimen obtained by molding as in Example 1 had, at a pulling speed of 5 mm./min., a tensile strength of 4.2 kg./mm.², an elongation at break of 30% and a modulus of elasticity of 136 kg./mm.².

EXAMPLE 10

Example 9 is repeated except that benzene is used as the solvent instead of the toluene.

The resulting product was white and opaque, and the conversion of the monomeric mixture of acrylonitrile and styrene was 68.5%. Hence, this is a resin containing 22.6% of the chlorinated polyethylene component. The test specimen obtained by molding as in Example 1 had, at a pulling speed of 5 mm./min., a tensile strength of 3.3 kg./mm.², an elongation at break of 26% and a modulus of elasticity of 250 kg./mm.².

EXAMPLE 11

The same procedures as described in Example 1 are followed, except that the reaction is carried out for 6 hours using benzoyl peroxide in an amount of 0.12 part as the catalyst and without using a solvent. The reaction mixture which at first is a liquid becomes a viscous solid as the reaction proceeds.

The resulting product was brown and opaque, and the conversion of the monomeric mixture of acrylonitrile and styrene was 72%. The test specimen obtained by molding this product as in Example 1 exhibited a tensile strength of 3 kg./mm.² at a pulling speed of 50 mm./min.

EXAMPLE 12

The same procedures as described in Example 7 are followed, except that the benzoyl peroxide is used in an amount of 0.04 part and the reaction is carried out for 4 hours at 100° C.

An almost colorless, transparent product is obtained at a conversion of 92%. This was a resin containing about 18% of the Hypalon–40 component.

This product was very tough, a test specimen made as in Example 1 having a tensile strength of 3.8 kg./mm.² at a pulling speed of 50 mm./min.

EXAMPLE 13

The same procedures as described in Example 1 are followed, except that the benzoyl peroxide is used in an amount of 0.06 part and the reaction time of 8 hours is used.

A light yellow, opaque resin containing 36% of the chlorinated polyethylene component is obtained. A test specimen obtained by molding this product as in Example 1 had a tensile strength of 2.8 kg./mm.² at a pulling speed of 50 mm./min.

EXAMPLE 14

The same procedures as described in Example 1 are followed except that the benzoyl peroxide is used in an amount of 0.06 part.

A light yellow, opaque resin containing 24% of the chlorinated polyethylene component is formed.

A test specimen obtained by molding this product as in Example 1 had a tensile strength of 3.6 kg./mm.² at a pulling speed of 50 mm./min. On the other hand, when a pulling speed of 5 mm./min. was used, the tensile strength was 3.3 kg./mm.², the elongation at break was 260% and the modulus of elasticity was 220 kg./mm.².

EXAMPLE 15

Except that a reaction time of 2 hours is used, otherwise the same experiment is carried out as in Example 1. The resulting product, which is an opaque thermoplastic resin containing 67% of the chlorinated polyethylene component, had very good pliability and its flame resistance was also excellent.

EXAMPLE 16

Example 1 is repeated, except that the reaction is carried for 8 hours using 4.7 parts of acrylonitrile and 5.3 parts of styrene. The conversion of the monomers was 97.5%. Hence, the product contains 17.1% of the chlorinated polyethylene component. When a tensile test was conducted on a test specimen molded as in Example 1, its tensile strength was 3.8 kg./mm.² at a pulling speed of 5 mm./min.

EXAMPLE 17

The same procedures as described in Example 1 are followed, except that for the reaction time is used 6 hours and for the quantities of the chlorinated polyethylene, acrylonitrile and styrene are used 3.0, 8.0 and 2.0 parts, respectively. The conversion of the monomers was 92% and hence the resulting product, which is a yellow thermoplastic resin, contains 24.6% of the chlorinated polyethylene component.

EXAMPLE 18

Except that instead of the chlorinated polyethylene 3 part of "Hypalon" 40 (Du Pont—chlorosulfonated polyethylene having a degree of chlorination of 35.6% and sulfur content of 1.5%) is used, otherwise the experiment is carried out as in Example 1. The conversion of the monomers was 100% and hence 22.8% of the "Hypalon" 40 is contained in the product. When this product was tested in accordance with the procedures described in Example 1, the tensile strength at a pulling speed of 5 mm./min. was 3.1 kg./mm.$^2$ and at a pulling speed of 50 mm./min was 3.3 kg./mm.$^2$

EXAMPLE 19

Five parts of the same "Hypalon" 40 as was used in Example 18, 5 parts of acrylonitrile, 15 parts of styrene, 40 parts of chloroform and 0.04 parts of benzoyl peroxide are reacted for 4 hours at 90° C. The conversion of the monomeric mixture of acrylonitrile and styrene in this instance was 73.7%. Hence, the resulting polymer contains 25.3% of the "Hypalon" 40. The product is colorless and transparent. The test specimen obtained by molding this product as in Example 1 had a tensile strength of 4.0 kg./mm.$^2$ at a pulling speed of 50 mm./min. and an impact strength by means of the Dynstat of 4.4 kg.-cm./cm.

EXAMPLE 20

Except that 6 parts of chlorinated polyethylene, 1 part of acrylonitrile, 3 part of styrene, 0.36 part of benzoyl peroxide and 60 parts of chloroform are used, otherwise the experiment is carried out as in Example 1. The conversion was 42.5% and the chlorinated polyethylene contained in the product was 78%.

EXAMPLE 21

An ampoule is filled with 2 parts of the same "Hypalon" 40 as was used in Example 18, 3.5 parts of acrylonitrile, 6.5 parts of methyl methacrylate, 0.18 part of benzoyl peroxide and 20 parts of chloroform. After freezing the monomers and solvents and evacuation of the system twice for 5 minutes at 10$^{-2}$ mm. Hg, the ampoule is melt-sealed. The ampoule is then heated for 16 hours at 60° C. followed by cooling. Then the contents thereof are poured into methanol to precipitate and separate the polymer, followed by drying under reduced pressure at 50° C. The product is yellow and transparent and the conversion of the monomeric mixture of acrylonitrile and methyl methacrylate is 79.2%. Hence, it can be seen that this product contains 20.1% of chlorinated polyethylene.

A test specimen was molded from this polymer as in Example 1 and then a tensile test was conducted in accordance with ASTM-D-638-61T. When a pulling speed of 5 mm./min. was used, the tensile strength was 3.2 kg./mm.$^2$, the elongation was 28% and the modulus of elasticity was 232 kg./mm.$^2$. On the other hand, when a flammability test was conducted in accordance with ASTM-D-635-56, the burning speed of this polymer was 94 seconds as compared with 64 seconds for that of "Cycolac" T (a type of ABS polymer produced by Marbon Chemicals Company).

EXAMPLE 22

Example 21 is repeated, except that the amounts used of the acrylonitrile and methyl methacrylate are 7 and 3 parts, respectively, and the heating time is 8 hours.

The resulting product was yellow and transparent, and the rate of polymerization of the monomeric mixture of acrylonitrile and methyl methacrylate being 37.9%. Hence, it is a resin containing 20.7% of chlorinated polyethylene.

When this resin was given the tensile test described in Example 21, the tensile strength exhibited at a pulling speed of 5 mm./min. was 3.5 kg./mm.$^2$ and at 50 mm./min. was 2.5 kg./mm.$^2$.

EXAMPLE 23

Example 21 is repeated, except that the chlorinated polyethylene, acrylonitrile and methyl methacrylate are used in the amounts of 4, 2 and 18 parts, respectively. The conversion of the monomeric mixture of acrylonitrile and methyl methacrylate was 96.3%. Hence, this is a three-component resin of chlorinated polyethylene, acrylonitrile and methyl methacrylate in which the chlorinated polyethylene content is 17.2%. When this was tested by means of the tensile test described in Example 21, the tensile strength and elongation at break at a pulling speed of 50 mm./min. were 4.1 and 46%, respectively. This resin when pressed yielded a light yellow, transparent molded article.

EXAMPLE 24

Except that the chlorinated polyethylene, acrylonitrile and methyl methacrylate are used in the amounts of 3, 9 and 1 parts, respectively, otherwise the experiment is carried out as in Example 21. The conversion of the monomeric mixture of acrylonitrile and methyl methacrylate was 90%. Hence, this is a three-component resin of chlorinated polyethylene, acrylonitrile and methyl methacrylate in which the chlorinated polyethylene content is 25%. The molded article obtained by pressing this resin was yellow in color and transparent.

EXAMPLE 25

An ampoule is charged with 2 parts of the same "Hypalon" 40 as was used in Example 18, 2.5 parts of acrylonitrile, 7.5 parts of styrene and 20 parts of chloroform. The monomers and the solvent is frozen and then the system is evacuated for 5 minutes at 10$^{-2}$ mm. Hg, following which the system is closed and the contents is melted. After repeating this operation twice, the ampoule is melt-sealed. Then, placing the ampoule in a 60° C. bath, it is irradiated with a 3×10$^5$ rad. dose of gamma rays of cobalt-60 at the dose rate of 10$^4$ rad./hr. The contents are then poured into methanol and the polymer is precipitated, following which it is isolated from the unreacted substances and the solvent then dried at 50° C. under reduced pressure. The conversion of the monomeric mixture of acrylonitrile and styrene was 70.5%, hence indicating that this product is a three-component resin of chlorinated polyethylene, acrylonitrile and styrene in which the chlorinated polyethylene content is 22.1%.

After putting this product through mixing rolls, it is formed into test specimen using a heated press. The specimen is then submitted to a tensile test in accordance with ASTM-D638-61T. At a pulling speed of 5 mm./min., the tensile strength was 3.5 kg./mm.$^2$, the elongation at break was 124% and the modulus of elasticity was 200 kg./mm.$^2$, while at a pulling speed of 50 mm./min., the tensile strength was 4.2 kg./mm. Molded articles made from this resin were colorless and transparent.

EXAMPLE 26

Example 25 is repeated, except that instead of the chloroform monochlorobenzene is used as the solvent and the dose irradiated is 4.0×10$^5$ rad.

The conversion of the monomeric mixture of acrylonitrile and styrene was 81.9%. Hence, this product is a three-component resin of chlorinated polyethylene, acrylonitrile and styrene in which the chlorinated polyethylene content is 19.7%. The test specimen obtained by molding this resin as in Example 25 had a tensile strength of 2.4 kg./mm.$^2$ and an elongation at break of 253% at a pulling speed of 5 mm./min. The molded article obtained from this resin was colorless and transparent.

EXAMPLE 27

Except that instead of the chloroform toluene is used as the solvent and the dose irradiated is $4.0 \times 10^5$ rad., otherwise the experiment is carried out as in Example 25.

The conversion of the monomeric mixture of acrylonitrile and styrene was 52.3%. Hence, this product is a three-component resin of chlorinated polyethylene, acrylonitrile and styrene in which the content of the chlorinated polyethylene is 27.7%. The test specimen obtained by molding this resin as in Example 25 exhibited at a pulling speed of 5 mm./min. a tensile strength of 2.0 kg./mm.$^2$, an elongation at break of 65% and a modulus of elasticity of 186 kg./mm.$^2$.

An article molded from this resin is colorless and transparent.

EXAMPLE 28

Except that the chlorinated polyethylene, acrylonitrile and styrene are used in the amounts of 5, 15 and 70 parts, respectively, and the dose used is $4.8 \times 10^5$ rad., otherwise the experiment is carried out as in Example 25. Since the conversion of the monomeric mixture of acrylonitrile and styrene was 63.3%, this indicates that this is a three-component resin of chlorinated polyethylene, acrylonitrile and styrene in which the content of the chlorinated polyethylene is 30.6%. The test specimen obtained by molding this resin as in Example 25 had a tensile strength of 3.4 kg./mm.$^2$ and an elongation at break of 150% at a pulling speed of 50 mm./min. This molded product was practically colorless and transparent. The burning speed as determined by the flammability test prescribed by ASTM D–635–56 was 144 seconds. A similar test conducted on "Cycolac" (an ABS polymer produced by Marbon Chemicals Company) resulted in a time of 64 seconds.

EXAMPLE 29

Example 25 is repeated, except that the chlorinated polyethylene, acrylonitrile and styrene are used in the amounts of 6, 1 and 3 parts respectively, and the dose used is $2.4 \times 10^5$ rad. In this case, the conversion of the monomeric mixture being 13.5%, the product was a three-component resin of chlorinated polyethylene, acrylonitrile and styrene in which the chlorinated polyethylene content was 92%. This product was practically rubber-like and articles molded therefrom had considerable transparency.

EXAMPLE 30

Except that the chlorinated polyethylene, acrylonitrile and styrene are used in the amounts of 2, 8 and 2 parts respectively, and the dose used is $2.4 \times 10^5$ rad., otherwise the experiment is carried out as in Example 25. The conversion of the monomeric mixture being 45.4%, the resulting product is a three-component resin of chlorinated polyethylene, acrylonitrile and styrene in which the content of the chlorinated polyethylene is 31%. The molded product was colorless and transparent.

EXAMPLE 31

Example 25 is repeated, except that 25° C. is used as the reaction temperature and a dose of $7 \times 10^6$ rad. is irradiated at the dose rate of $10^5$ rad./hr. In this case, the conversion of the monomeric mixture being 68.7%, the product is a three-component resin of chlorinated polyethylene, acrylonitrile and styrene in which the chlorinated polyethylene content is 23%. When this resin was molded as in Example 25 and submitted to a tensile test, it had a tensile strength of 3.2 kg./mm.$^2$ at a pulling speed of 50 mm./min. This molded article was colorless and transparent.

EXAMPLE 32

Except that the chlorinated polyethylene, acrylonitrile and styrene are used in the amounts of 5, 5 and 15 parts, respectively, a solvent is not used, 25° C. is used as the reaction temperature, and as the dose is used $1.2 \times 10^6$ rad. at the dose rate of $6 \times 10^4$ rad./hr., otherwise the experiment is carried out as in Example 25. The conversion of the monomeric mixture of acrylonitrile and styrene in which the content of the chlorinated polyethylponent resin of chlorinated polyethylene, acrylonitrile and styrene in which the content of the chlorinated polyethylene is 20.8%. A test specimen obtained by molding this resin as in Example 25 had a tensile strength of 5.5 kg./mm.$^2$ at a pulling speed of 500 mm./min. This molded article had a slight yellowish tinge and was transparent.

EXAMPLE 33

Except that the chlorinated polyethylene (degree of chlorination 27%), acrylonitrile, styrene and chloroform are used in the amounts of 5, 5, 15 and 40 parts, respectively, a reaction temperature of 25° C. is used and a dose of $1.2 \times 10^6$ rad. at the dose rate of $6 \times 10^4$ rad./hr. is used, otherwise the experiment is carried out as in Example 25. The conversion of the monomeric mixture of acrylonitrile and styrene was 61%. Hence, this product is a three-component resin of chlorinated polyethylene, acrylonitrile and styrene in which the chlorinated polyethylene content is 29%. A test specimen obtained by molding this resin as in Example 25 has a tensile strength of 2.1 kg./mm.$^2$ at a pulling speed of 500 mm./min. This molded article is colorless and considerably transparent.

EXAMPLE 34

Forty grams of chlorinated polyethylene (degree of chlorination 34% by weight), 32 g. of acrylonitrile, 108 g. of styrene and 3 g. of benzoyl peroxide are charged into a 500-cc. flask along with 240 cc. of chlorobenzene. After replacing the system with nitrogen, the reaction is carried out at 60° C. for 13 hours while effecting the flow of a small amount of nitrogen. After completion of the reaction and cooling, the contents are poured into methanol to precipitate and separate the polymer, which is then dried at 50° C. under reduced pressure. The conversion in this instance was 89%. Hence, this reaction product is a three-component resin of chlorinated polyethylene, acrylonitrile and styrene in which the chlorinated polyethylene content is 25%.

The mixture of this three-component resin (hereinafter referred to as sample A) and polyvinylchloride is carried out on 8-inch rolls with roll surface temperature of 140° C. and a kneading time of about 10 minutes. The polyvinylchloride used is a powdered rigid polyvinylchloride having an average degree of polymerization of 1450, while as stabilizers are added 5 parts of dibasic lead phosphite and 2 parts of barium stearate (in both instance on the basis of 100 parts of the polyvinylchloride).

Tests of the tensile strength, elongation, Izod impact strength and flammability were conducted on the foregoing mixture of the three-component resin A and polyvinylchloride with respect to the three cases in which the weight ratios of the kneaded mixture were 80:20, 50:50 and 20:80. By way of comparison, the same tests were conducted on a mixture of ABS polymer ("Cycolac" T) and polyvinylchloride of the same grade kneaded under the same conditions with respect to the three cases in which the weight ratios of the mixtures were likewise 80:20, 50:50 and 20:80, as well as the case in which the polyvinylchloride alone (including the stabilizers) was kneaded. These results are shown together in Table II.

TABLE II

| Sample | Tensile Strength, kg./cm.² | Elongation at Break, percent | Impact Strength, ft.-lb./in.² | Flammability |
|---|---|---|---|---|
| 80% A+20% PVC [1] | 316 | 100 | 47.5 | Self-extinguished in 69 seconds. |
| 50% A+50% PVC | 350 | 90 | 48.2 | Self-extinguished in 10 seconds. |
| 20% A+80% PVC | 510 | 60 | 89.6 | Self-extinguished immediately. |
| 80% ABS+20% PVC | 470 | 30 | 24.7 | Burned in 90 seconds. |
| 50% ABS+50% PVC | 485 | 30 | 19.1 | Self-extinguished in 20 seconds. |
| 20% ABS+80% PVC | 526 | 90 | 62.2 | Self-extinguished immediately. |
| PVC | 532 | 120 | 9.3 | Do. |

[1] PVC=polyvinylchloride.

In this test the tensile strength and elongation at break were measured on an Instron tensile tester at a crosshead speed of 10 cm./min. in a constant temperature room of 20° C., using a sample molded into a 1-mm.-thick sheet by compression molding at 180° C. and stamping into Japan Industrial Standard No. 3 dumbell. The impact strength is the result of a measurement in a constant temperature room of 20° C. in accordance with the method of ASTM–D256–54T, using a sample molded into a 4-mm.-thick sheet by compression molding at 180° C. and cutting therefrom an unnotched test piece 12.7 mm. width and 62 mm. length. The flammability test was conducted in accordance with ASTM–D635–56, using a 1.5-mm.-thick sheet. As is apparent from Table II, the mixed composition consisting of polyvinylchloride and the three-component resin obtained from chlorinated polyethylene, acrylonitrile and styrene exhibits a very high impact strentgh when the weight ratio of this mixed composition of the three-component resin and polyvinylchloride is 20:80. Further, as is shown by the results of flammability test, it can be seen that the three-component resin which when used alone burns up in 140 seconds, becomes self-extinguishable by the mixture therewith of about 20% by weight of polyvinylchloride.

EXAMPLE 35

The three-component resin A prepared by the same procedures as described in Example 34 is mixed with polyvinylchloride in a weight ratio of 20:80 and dibasic lead phosphite and barium stearate are incorporated as stabilizers likewise as in the previous example to obtain a mixture composition. To 100 parts of this mixed composition (to be referred to as B) are mixed, using 8-inch rolls at 140° C., 10 and 20 parts of polymethylemethacrylate to obtain the respective mixed compositions C and D. Tests were conducted for the tensile strength, elongation at break, surface luster and abrasion on the three cases B, C and D, whereby were obtained results shown in Table III.

TABLE III

| Sample | Tensile Strength, kg./cm.³ | Elongation at Break, percent | Surface Luster | Abrasion Test cc./HP-hr. |
|---|---|---|---|---|
| B | 510 | 65 | 37 | 30 |
| C | 559 | 60 | 48 | 26 |
| D | 598 | 65 | 77 | 16 |

The same procedures were followed in measuring the tensile strength and elongation at break as in Example 34. The sample used for measuring the surface luster indicated in the table was a 1-mm.-thick sheet molded by clasping between two sheets of new ferrotype plates and compression molding with a 180° C. press. And the method of measurement used was in accordance with the procedures prescribed by JIS (Japan Industrial Standard)-Z-8741, the 60 degree mirror plane luster being measured using a 60 degree mirror plane luster meter. In measuring the abrasion a Williams type abrasion tester was used and the measurement time used was 5 minutes. The values indicated are the amount of abrasion (cc.) per one horsepower per one hour, the temperature at the time of measurement being 25° C.

As shown in Table III, it is apparent that an improvement is had in the tensile strength, surface luster and resistance to abrasion by the incorporation of polymethylmethacrylate.

What we claim is:

1. A thermoplastic resin having high impact strength which is obtained by polymerizing a homogeneous mixture comprising (a) chlorinated polyethylene having a degree of chlorination of 10–50% by weight, (b) acrylonitrile, and (c) methyl methacrylate, said components being contained in a weight ratio of 10–80% of (a) to 90–20% of (b) plus (c), the weight ratio of component (b) to component (c) being from 10:90 to 90:10.

2. A process for producing a thermoplastic resin having high impact strength which comprises polymerizing a homogeneous mixture consisting of (a) chlorinated polyethylene having a degree of chlorination of 10–50% by weight, (b) acrylonitrile and (c) methyl methacrylate, said components being contained in a weight ratio of 10–80% of (a) to 90–20% of (b) plus (c) the weight ratio of component (b) to component (c) being from 10:90 to 90:10, and thereafter separating the solid polymer.

3. The process according to claim 2 in which said polymerization reaction is effected at a temperature of 40°–150° C. in the presence of a radical-forming polymerization catalyst.

4. The process according to claim 2 in which said polymerization reaction is effected at a temperature of 15°–60° C. under irradiation of a radiation selected from the group consisting of ionizing radiations and ultraviolet rays.

5. The process according to claim 4 in which said radiation is irradiated in a dose of $10^4$–$10^7$ rad. at a dose rate of $10^2$–$10^6$ rad. per hour.

6. The process according to claim 2 in which said homogeneous mixture is formed in the absence of a solvent.

7. The process according to claim 2 in which said homogenous mixture is formed using at least one non-polymerizable organic solvent selected from the group consisting of the halogenated aliphatic hydrocarbons, the halogenated aromatic hydrocarbons and the aromatic hydrocarbons.

8. A thermoplastic resin composition having high impact strength comprising:
(A) a thermoplastic resin obtained by reacting a homogeneous mixture consisting of (a) chlorinated polyethylene having a degree of chlorination of 10–50% by weight (b) acrylonitrile and (c) methyl methacrylate, the range of weight ratio of said (a) to (b) plus (c) being 10:90 to 80:20, and the range of weight ratio of said (b) to (c) being 10:90 to 90:10, and
(B) a polyvinylchloride resin having a degree of polymerization of 500–2000,
said A and B being mechanically blended in a weight ratio of A to B of 20:80 to 80.20.

9. A thermoplastic resin composition having high impact strength comprising:
(A) a thermoplastic resin obtained by reacting a homogeneous mixture consisting of (a) chlorinated polyethylene having a degree of chlorination of 10–50% by weight, (b) acrylonitrile and (c) methyl methacrylate, the range of weight ratio of said (a) to (b) plus (c) being 10:90 to 80:20, and the range of weight ratio of said (b) to (c) being 10:90 to 90:10, and
(B) a polyvinylchloride resin having a degree of polymerization of 500–2000, and (C) polymethyl methacrylate,
said A, B and C being mechanically blended in a weight ratio of A to B of 20:80 to 80:20, and C in an amount of 5–30 parts based on 100 parts of combined weight of A and B.

References Cited

UNITED STATES PATENTS

| | | | |
|---|---|---|---|
| 3,143,521 | 8/1964 | Thompson et al. | 204—159.17 |
| 3,158,665 | 11/1964 | Herbig et al. | 260—897 |
| 3,162,696 | 12/1964 | Zimmerman et al. | 260—878 |
| 3,227,781 | 1/1966 | Klug et al. | 260—897 |
| 3,268,623 | 8/1966 | Beer | 260—876 |
| 3,298,942 | 1/1967 | Magat et al. | 260—877 |

GEORGE F. LESMES, Primary Examiner

U.S. Cl. X.R.

204—159.17; 260—878